(12) United States Patent
Venable, Sr. et al.

(10) Patent No.: US 12,019,762 B2
(45) Date of Patent: *Jun. 25, 2024

(54) BLOCKCHAIN SYSTEM WITH SEVERABLE DATA AND CRYPTOGRAPHIC PROOF

(71) Applicant: Cisco Technology, Inc., San Jose, CA (US)

(72) Inventors: Jeffrey C. Venable, Sr., Union City, CA (US); Ramanathan Jagadeesan, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/450,839

(22) Filed: Oct. 14, 2021

(65) Prior Publication Data

US 2022/0035937 A1 Feb. 3, 2022

Related U.S. Application Data

(63) Continuation of application No. 16/374,364, filed on Apr. 3, 2019, now Pat. No. 11,151,261.

(51) Int. Cl.
| | |
|---|---|
| *H04L 9/06* | (2006.01) |
| *G06F 16/23* | (2019.01) |
| *G06F 21/60* | (2013.01) |
| *G06F 21/62* | (2013.01) |
| *H04L 9/32* | (2006.01) |
| *H04L 9/00* | (2022.01) |

(52) U.S. Cl.
CPC ........ *G06F 21/602* (2013.01); *G06F 16/2379* (2019.01); *G06F 21/6218* (2013.01); *H04L 9/0637* (2013.01); *H04L 9/0643* (2013.01); *H04L 9/3218* (2013.01); *H04L 9/50* (2022.05)

(58) Field of Classification Search
CPC .... G06F 21/602; G06F 21/6218; G06F 21/64; G06F 2221/2141; H04L 9/0637; H04L 9/0643; H04L 9/3218; H04L 2209/38
See application file for complete search history.

(56) References Cited

U.S. PATENT DOCUMENTS

| | | | |
|---|---|---|---|
| 10,819,722 B2* | 10/2020 | Dhakshinamoorthy | ..................... G06F 21/6218 |
| 2018/0183687 A1* | 6/2018 | Dementev | ............... H04L 41/50 |
| 2019/0140822 A1* | 5/2019 | Xie | ........................ G06Q 20/382 |
| 2019/0158594 A1* | 5/2019 | Shadmon | ................ H04L 67/01 |
| 2019/0188701 A1* | 6/2019 | Parsons | ..................... H04L 9/14 |
| 2019/0238550 A1* | 8/2019 | Zhang | .................... H04L 63/105 |
| 2020/0099686 A1* | 3/2020 | Anders | ................. G06F 16/353 |
| 2020/0210620 A1* | 7/2020 | Haletky | ................. G06N 20/00 |

* cited by examiner

*Primary Examiner* — Khoi V Le

(74) *Attorney, Agent, or Firm* — Patterson + Sheridan, LLP

(57) ABSTRACT

The present disclosure provides an approach for a blockchain system in which (a) data of past transactions can be removed from the storage of network nodes based on node permissions, and (b) in which data can be made invisible to users based on user-specific or group-specific permissions. The blockchain system stores cryptographic proofs of data on an immutable ledger. The data itself is maintained within the blockchain system such that it can be partially or fully removed, while maintaining the integrity of the ledger.

19 Claims, 10 Drawing Sheets

BLOCKCHAIN SYSTEM WITH SEVERABLE DATA AND CRYPTOGRAPHIC PROOF

CROSS-REFERENCE TO RELATED APPLICATIONS

This application is a continuation of co-pending U.S. patent application Ser. No. 16/374,364 filed Apr. 3, 2019. The aforementioned related patent application is herein incorporated by reference in its entirety.

TECHNICAL FIELD

Embodiments presented in this disclosure generally relate to a blockchain system. More specifically, embodiments disclosed herein related to handling data operations by a blockchain system while enforcing group and user-specific permissions associated with the participants of blockchain system.

BACKGROUND

A blockchain is a growing list of records or blocks connected using cryptographic techniques (i.e., hashes). A blockchain is composed of many copies or instances of the blockchain, and the copies are synchronized using a consensus mechanism. The blockchain is typically managed by a peer-to-peer network in which nodes follow a communication protocol and block validation protocol. Once a block is recorded on the blockchain, the data cannot be altered retroactively without alteration of all subsequent blocks, which requires consensus of other nodes in the blockchain network. Additionally, data on a conventional blockchain is available to all participants of the blockchain. However, some participants may wish to redact from the blockchain previously added information, and some participants may not want to share all information that is on the blockchain with other participants.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method of performing a data operation on a first blockchain node within a blockchain system, the blockchain system comprising a plurality of blockchain nodes, the blockchain system comprising an immutable blockchain distributed among the plurality of blockchain nodes and a data set distributed among the plurality of blockchain nodes, wherein the immutable blockchain comprises cryptographic proofs of data of the data set, the method comprising: receiving, by the first blockchain node of the plurality of blockchain nodes, the data operation from an entity; obtaining from the data operation an identifier of a data object; obtaining permissions associated with the entity; and based on the permissions, executing the data operation by accessing the data set.

EXAMPLE EMBODIMENTS

The present disclosure provides an approach for a blockchain system in which data of past transactions can be removed from the storage and/or memory of network nodes. The data can be removed based on node permissions. The disclosure also provides an approach in which data can be made invisible to users based on user-specific or group-specific permissions. The blockchain system stores cryptographic proofs of data on an immutable ledger. The data itself is maintained within the blockchain system such that the data can be partially redacted or fully redacted, while maintaining the integrity of the ledger.

Figure 1:
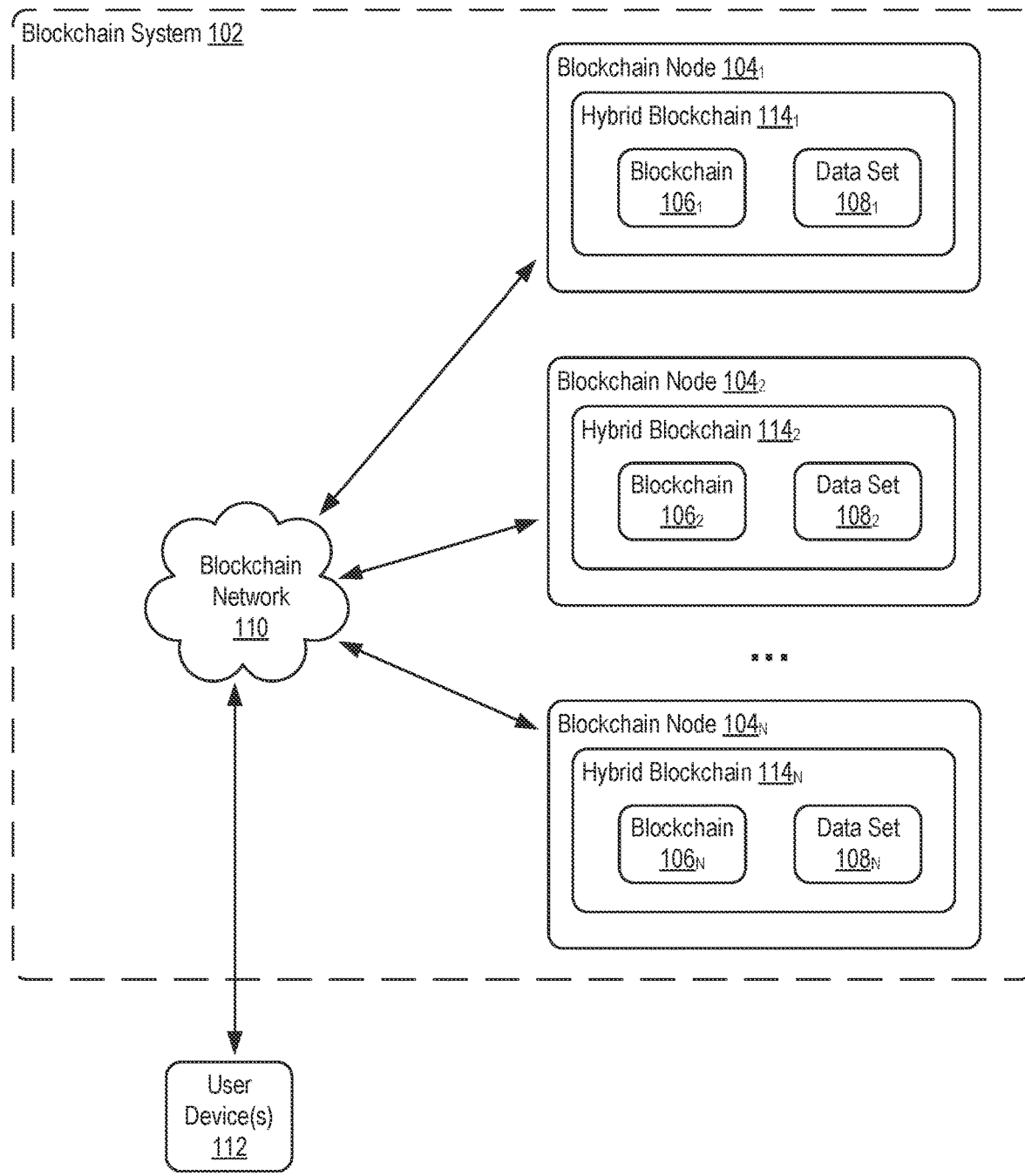
FIG. 1 depicts a block diagram of a computing system in which one or more embodiments of the present disclosure may be utilized.

FIG. 1 depicts a block diagram of a computing system 100 in which one or more embodiments of the present disclosure may be utilized. The computing system 100 includes a blockchain system 102 and one or more user devices 112 connected to the blockchain system 102 through a network that comprises, for example, a direct link, a local area network (LAN), a wide area network (WAN), another type of network. The user device 112 may be, for example, a desktop computer or a mobile device. The blockchain system 102 includes one or more blockchain nodes $104_1$-$104_N$ (collectively referred to as blockchain nodes 104 and individually referred to as blockchain node 104) connected through a blockchain network 110. The blockchain network 110 may comprise, for example, a direct link, a LAN, a WAN, or another type of network. The blockchain network 110 may support a peer-to-peer communication protocol.

Each blockchain node 104 comprises a hybrid blockchain 114. Each hybrid blockchain 114 comprises an instance or copy of a distributed blockchain 106 and, optionally, an instance or copy of a distributed data set 108. In an embodiment, blockchain 106 is immutable while data set 108 is mutable. In a second embodiment, blockchain 106 is immutable while data set 108 is also immutable. Data set 108 may be immutable, for example, when all requesters of data are entities that are not blockchain nodes 104, but rather, users or user devices 112 that do not function as one of nodes 104. For an entity to not function as one of nodes 104 may mean, for example, that the entity does not contain a copy of blockchain 106 and/or does not contain a copy of data set 108. Requestors of data may also be referred to as "senders of data operations" to one or more nodes 104. A first type of blockchain includes data and hashes of that data within blocks of the blockchain, but a hybrid blockchain 114 is divided such that the hashes of the data are stored on the immutable blockchain 106, while the data of which the hashes are calculated is stored separately on data set 108. Blockchain 106 and data set 108 are further described with reference to FIG. 2, below. As used herein, a "distributed" blockchain 106 is a blockchain whose portion or entirety is located on each node 104 of the blockchain system 102. As used herein, a "distributed" data set 108 is a data set whose portion or entirety is located on each node 104 of the blockchain system 102.

Each blockchain node 104 may be a computing device with hardware components such as a processor, a memory, and a storage. Each blockchain node 104 may contain additional components not shown in FIG. 1, such as components shown in FIG. 5.

Figure 2:
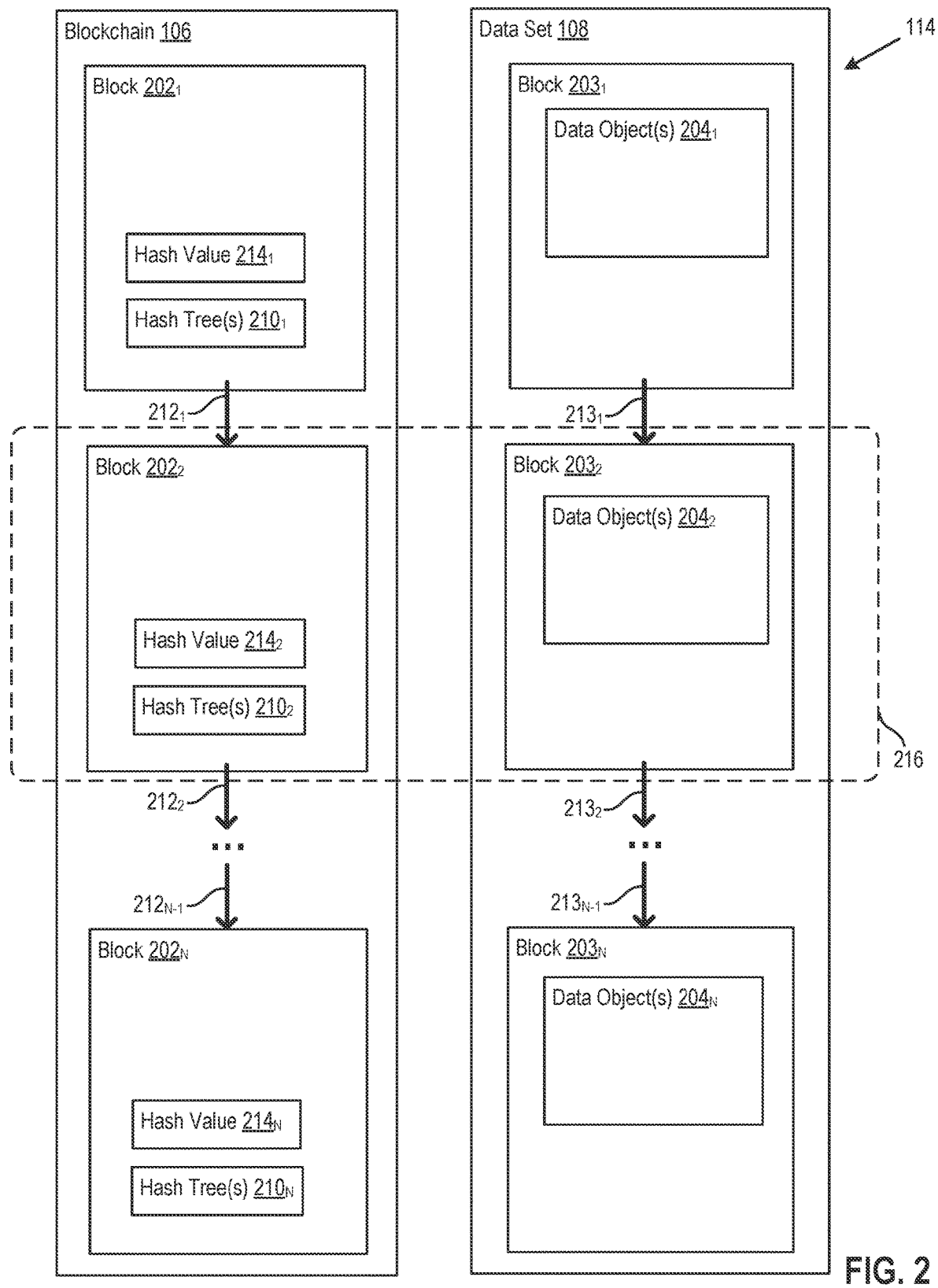
FIG. 2 depicts a block diagram of an exemplary distributed hybrid blockchain, according to an embodiment.

FIG. 2 depicts a block diagram of an exemplary distributed hybrid blockchain 114, according to an embodiment. The blockchain 106 of the hybrid blockchain 114 is a distributed data structure, a copy of which is located at one or more locations throughout the blockchain system 102. The blockchain 106 is a data structure used for storage of data, such as hash trees 210. The blockchain 106 comprises one or more data blocks 202 connected by pointers 212.

Each block 202 comprises one or more hash trees 210, a pointer 212, and optionally a hash value 214. The hash value 214 is optional because the root hash 410 (see FIG. 4) may serve the same function as the hash value 214 by including within the data being hashed to obtain root hash 410 all root hashes 410 of the previous block 210, as further described below.

The hash value 214 is an output of a hash function, such as secure hash algorithm (SHA)-3 or Keccak256. The hash value 214 of the first block (i.e., block $202_1$) of the blockchain 106 results from hashing input that comprises all data within block $203_1$. The hash value 214 of all subsequent blocks (i.e., blocks $202_2$-$202_N$) results from hashing input that comprises all data within block 203 of the same transaction 216, as well as the hash value 214 of the previous block 202. Because the input that results in the hash value 214 comprises the hash value 214 of the previous block, the structure of blockchain 106 can be authenticated and validated. If a malicious entity attempts to modify data of the blocks 202 or 203, the modification will be noticed through a comparison of the hash value 214 of that block and a recalculation of hash value 214 using the same hash function and the same inputs as used for obtaining hash value 214 stored in that block. A copy of hybrid blockchain 114 containing an unauthorized modification is discarded through the blockchain consensus mechanism, and the copy is replaced by a copy without the unauthorized modification.

In an embodiment, the hash value 214 is unnecessary and the validation role of the hash value 214 described above is served by the root hash 410 within the root node 304 of the hash tree 210. Root hash 410 may serve a validation and authentication role of hash value 214 by including, within the data hashed to obtain root hash 410, the root has 410 of the hash tree 210 of the previous block 202. If more than one hash trees 210 are present in the previous block 202, then the root hash 410 may include, within the data hashed to obtain root hash 410, all the root hashes 410 of all the hash trees 210 of the previous block 202.

The hash tree 210 comprises one or more hashes 408 (see FIG. 4) obtained by hashing some or all of the data object 204, as further described below with reference to FIG. 3 and FIG. 4. Each hash tree 210 within a single block 202 is associated with a data object 204 of data set 108. For example, the hash tree $210_1$ is associated with the data object $204_1$, the hash tree $210_2$ is associated with the data object $204_2$, and the hash tree $210_N$ is associated with the data object $204_N$. The hash tree 210 is further described below with reference to FIG. 3. In an embodiment, block 202 comprises no data except the one or more hash trees 210.

Each one of the blocks 202 is associated with one of the blocks 203. Together, a pair of the blocks 202 and 203 comprises a transaction 216 on the hybrid blockchain 114. For example, the block $202_2$ and its associated block $203_2$ may form a transaction 216. The transaction 216 may be thought of as an event, the event occurring when a pair of blocks 202 and 204 is added to the hybrid blockchain 114. For example, when the block $203_2$ containing the data object $204_2$ is added to the data set 108, the hash tree $210_2$ is also created, the hash tree $210_2$ containing one or more hashes 408 of some or all of data object $204_2$. Hash tree 210 is then added to a new block $202_2$ on blockchain 106. The two blocks 202 and 203 thereby are cryptographically linked, because the one or more hashes 408 within hash tree 210 are calculated from data object 204. Within FIG. 2, the pair of blocks $202_1$ and $203_1$ may be thought of as a first transaction, the pair of blocks $202_2$ and $203_2$ may be thought of as a second transaction, and the pair of blocks $202_N$ and $203_N$ may be thought of as the most recent transaction occurring on the hybrid blockchain 114.

As used herein, a "copy" of distributed blockchain 106 may be a full copy or a partial copy. For example, the blockchain $106_1$ (see FIG. 1) may contain blocks $202_1$ and $202_2$, and not contain the block $202_3$ (not shown) through $202_N$. But the blockchain $106_2$ may contain blocks $202_2$ through $202_N$, and not contain blocks $203_1$ and $203_2$. However, content within the same block 202 (wherein "same" is determined by the number of the block 202 in the sequence of blocks) in different copies of blockchain 106 is identical. Continuing the previous example, the block $202_2$ in both blockchain $106_1$ and $106_2$ has identical content.

Each block 202 of blockchain 106 comprises a pointer 212, which may be an address within a memory or storage containing the copy of blockchain 106. The first block of the blockchain 106 (i.e., block $202_1$) contains the pointer $212_1$, which points to the location in storage or memory containing the next block of the blockchain 106 (i.e., block $202_2$). The last block of blockchain 106 (i.e., block $202_N$) has pointer 212 with a null value, or alternatively, does not have pointer 212.

The data set 108 is a distributed data structure, a copy of which is located at one or more locations throughout the blockchain system 102. The data set 108 may be, for example, a linked list or an array. The data set 108 is a data structure used for storage of data, such as data objects 204.

The data set 108 comprises one or more data blocks 203 optionally connected by pointers 213. Each pointer 213 may be an address within a memory or storage containing the copy of data set 108. Pointers 213 are not necessary if, for example, data set 108 is an array. The data object 204 may be any type of data object, such as for example an executable smart contract or a non-executable data representing various information, such as a company hierarchy, a person's assets, contents of a book, etc.

As used herein, a "copy" of distributed data set 108 may be a full copy or a partial copy. For example, the data set $108_1$ may contain blocks $203_1$ and $203_2$, and not contain the block $203_3$ (not shown) through $203_N$. But data set $108_2$ may contain blocks $203_2$ through $203_N$, and not contain blocks $203_1$ and $203_2$. In addition, content within the same block 203 (wherein "same" is determined by the number of the block 203 in the sequence of blocks) in different copies of data set 108 may also be different. That is, the same block 203 may contain the same object(s) 204 or object identifier (s), but the object(s) 204 itself may have some or all of its data redacted, as further discussed below with reference to FIG. 3. A node 104 that contains only some of the data set 108 may be referred to as a "lightweight" node 104. A node 104 that contains all of the data set 108 may be referred to as a "historian" node 104.

Each copy of the hybrid blockchain 106 is synchronized with other copies within the blockchain 102 using a consensus mechanism. The consensus mechanism may be a modified version of a standard consensus mechanism, the standard mechanism being for example proof-of-work, proof-of-stake, proof-of-authority, etc. The modification of the standard consensus mechanism includes synchronizing the data set 108 together with the blockchain 106, as opposed to only synchronizing blockchain 106. The modified or custom consensus mechanism of blockchain 106 synchronizes the data set 108 while synchronizing the immutable blockchain 106. In this sense, the modified consensus mechanism may be referred to as a consensus mechanism of the hybrid blockchain 114.

The modified consensus mechanism may also check permissions of a target node 104 before sending to the target node a new copy of a newly added transaction 216. If the target node 104 does not have permission to some of the data added to the hybrid blockchain 114 as part of a new transaction 216, then the sending node 114 may redact, based on target node permissions, some nodes 310 of the data object 204 before sending the new blocks 202/203 of the new transaction to the target node 104. The consensus mechanism may redact and transmit the redacted data similarly to steps 728 and 730 described with reference to FIG. 7, below.

The modified or custom consensus mechanism may also operate to maintain a "historian node" 104. If, for example, an operation is sent to delete certain information from all nodes 104 of the blockchain system 102, such information may be deleted from all nodes except the historian node 104, which may store all information that has ever been stored on the hybrid blockchain 114.

For an example of the modified consensus mechanism, assume that the block $202_N$ is added to a copy of the blockchain 106, and along with block $202_N$, associated block $203_N$ is added to data set 108. Thereafter, the block $202_N$ is added to all other copies of the blockchain 106 through the modified consensus mechanism and all or substantially all copies of the blockchain 106 become synchronized to include the block $202_N$ following the block $202_{N-1}$ (not shown). Through the same modified consensus mechanism, the block $203_N$ is also transmitted and added to all other copies of the data set 108 through the modified consensus mechanism and all or substantially all copies of the data set 108 become synchronized to include the block $203_N$ following the block $203_{N-1}$ (not shown).

The modified consensus mechanism ensures that if a malicious entity tampers with one copy or a few copies of the hybrid blockchain 114, the tampered (modified by malicious entity) copies are discarded and the untampered (unmodified by malicious entity) copies are used by the blockchain system 102.

Figure 3:
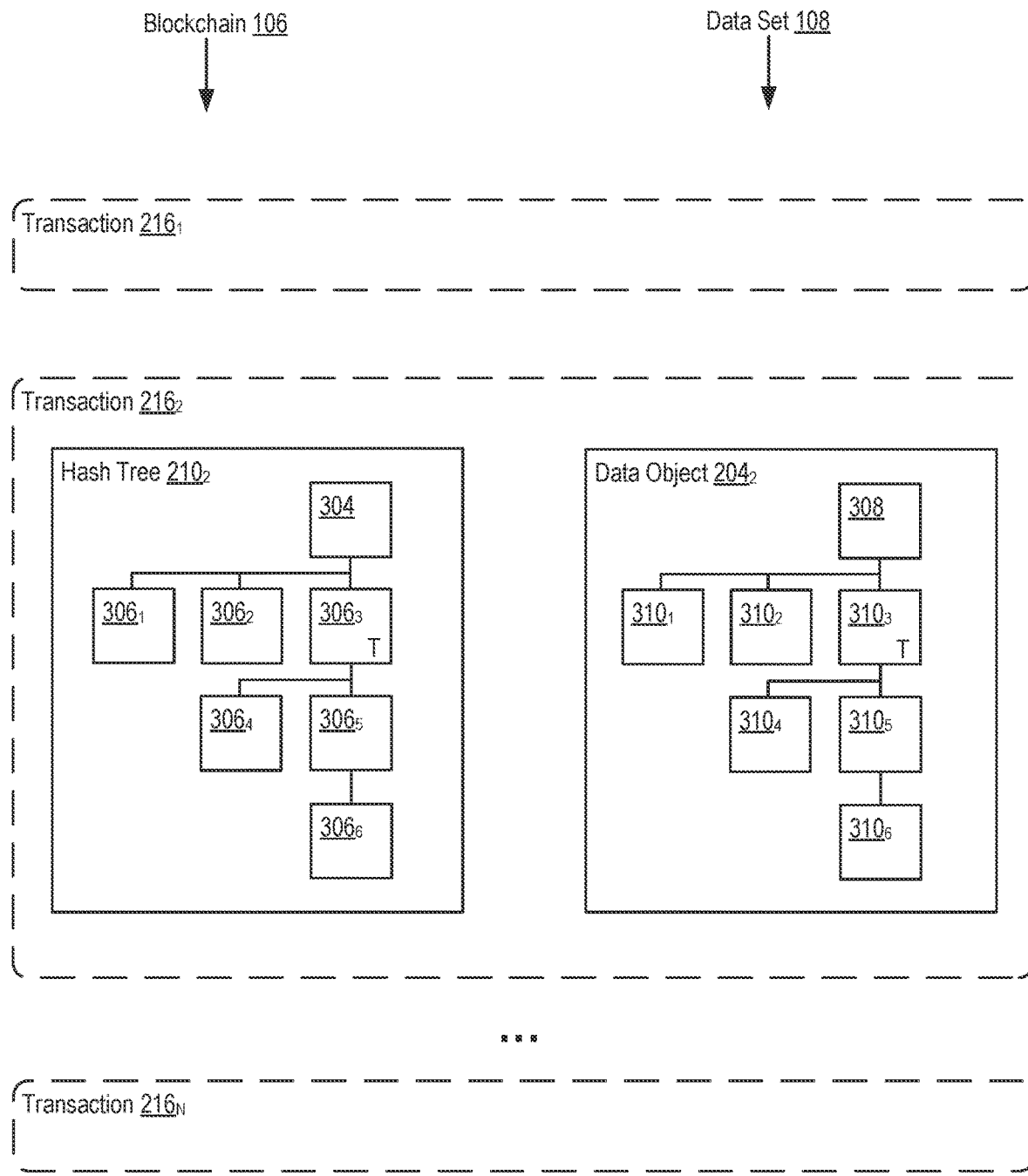
FIG. 3 depicts a block diagram of an exemplary transaction, according to an embodiment.

FIG. 3 depicts a block diagram of an exemplary transaction 216 with an expanded view of an exemplary hash tree 210 and an exemplary data object 204, according to an embodiment. FIG. 3 depicts a plurality of transactions 216, showing details of one of the transactions 216, the detailed transaction being $216_2$. Transaction $216_2$ of FIG. 3 may be the transaction 216 shown in FIG. 2. Transaction $216_2$ comprises blocks $202_2$ and $202_3$, but for brevity, only hash tree $210_2$ and data object $204_2$ are shown. The left side of FIG. 3 represents blockchain 106, and the right side of FIG. 3 represents data set 108.

As shown in FIG. 3, the data object 204 comprises one or more data object nodes 308, 310. The data object 204 comprises one node that can be considered as the root node 308, or a node that is the identifying or "top" node of the object. The exemplary data object 204 shown in FIG. 3 has a tree structure with the root node 308 being the top node containing identifying information about the data object 204. Details of the root node 308 are shown in FIG. 4A.

Figure 4A:
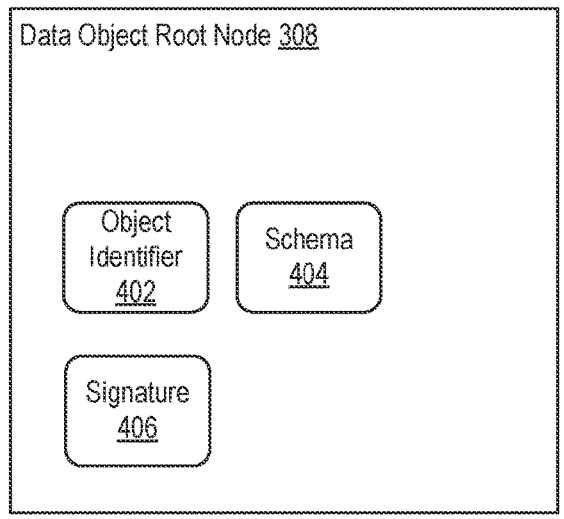
FIG. 4A depicts a block diagram of an exemplary data object root node, according to an embodiment

FIG. 4A depicts a block diagram of an exemplary data object root node 308, according to an embodiment. The root node 308 comprises an object identifier 402, and optionally, an object schema 404 and a signature 406. The object identifier 402 may be any combination of bits that uniquely identifies the data object 204 that comprises the identifier. For example, the blockchain system 102 may be used by a company that operates a chain of bookstores to manage sales and inventory. The object identifier 402 may be of type "string" and called "StoreID," representing a unique bookstore operated by the company.

The object schema 404 represents the structure of the data object 204. For example, if data object 204 is a tree, then object schema 404 may be a list describing the number of child nodes 310 that the root node 308 has, the number of child nodes 310 that each child node 310 has, etc. Although the object schema 404 is shown as located within the root node 308, the object schema 404 may be located anywhere within the computing system 100 that is accessible by the blockchain node 104.

The signature 406 is a signature or key that uniquely identifies the entity that added transaction 216 to the hybrid blockchain 114, the transaction 216 containing the data object 204 in question. The signature 406 may be, for example, a public key infrastructure (PKI) public key of the entity.

The blockchain system 102 comprises a plurality of entities or participants. An entity may be, for example, one of nodes 104, one of user devices 112, a user of one of user devices 112, or a smart contract within the blockchain system 102. An entity may be one of the foregoing entities but located outside of the blockchain system 102 or outside of the computing system 100. An entity may be, for example, a company that owns a chain of bookstores. Rather than being associated with a signature, an entity may instead be associated with a token that anonymizes the identity of the entity.

Each entity is associated with a set of permissions regarding what data operations the entity may execute within the blockchain system 102, and/or regarding on what data the entity may perform data operation within the blockchain system 102. Associations between (a) the entity's signature 406 or token, and (b) permissions, may be stored within a key store 506 (see FIG. 5) of each node 104 as a result of registration of the entity with the blockchain system 102. That is, obtaining the permissions associated with an entity may be based on one or more of: (a) authentication of the signature 406 of the entity, (b) authentication of a token associated with the entity, wherein the token anonymizes the identity of the entity, or (c) a zero-knowledge-proof.

Permissions may be based on, for example, jurisdiction (geographic location of the entity), membership of the entity in a group, or entity-specific such as role-based based permissions. Permissions may be associated with tags that are placed on data object nodes 308/310 and/or hash tree nodes 304/306 to indicate that certain permissions apply or do not apply to data within the nodes.

For example, all entities located within a certain country may have access to certain data, such as data created by others within that country, while other entities are excluded from accessing that information. For another example, if blockchain 102 is used to manage a hospital system, then doctors may have access to all data except the social security number of the patient, while nurses may have access to only a particular set of patient data.

Returning to FIG. 3, the root node 308 may have one or more child nodes 310. It should be noted that although FIG. 3 shows data object 204 as having a tree structure with a plurality of nodes, data object 204 may be a tree comprising a single node 308, or may be of a different structure than a tree, such as an array or linked list. The child nodes 310 may store various types of information for sub-objects, as per the schema 404. Following the bookstore example above, the root node 308 may contain an object identifier 402 for a bookstore. The schema 404 of the object 204 may indicate that the three child nodes $310_1$, $310_2$, and $310_3$ store data regarding store address, store revenue, and store inventory, respectively. Node $310_3$ and its direct and indirect child nodes may be regarded as a "store inventory" sub-object of the store object represented by root node 308 and all its direct and indirect child nodes.

The schema 404 may further indicate that child node $310_3$ has two child nodes $310_4$ and $310_5$, which divides the bookstore's inventory into two categories, fiction and non-fiction, respectively. Although not fully shown, each child node $310_4$ and $310_5$ may then contain child nodes 310 for subcategories of books or for each book within the bookstore, and each book may have individual child nodes for author, publisher, title, contents, etc.

The hash tree 210 is a data structure that comprises one or more cryptographic proofs (i.e., hashes) of the data within the data object 204 of the same transaction 216 as the hash tree 210. A hash tree 210 that comprises cryptographic proof of a data object 204 may be referred to herein as a "mirror" hash tree 210 of that data object 204. Similarly, a data object 204 whose data is used to create cryptographic proofs within a hash tree 210 may be referred to herein as a "mirror" data object 204 of that hash tree 210.

In an embodiment, the hash tree 210 has the identical object form or schema 404 as its mirror data object 204. That is, if the data object 204 is a tree comprising a root node 308, three direct child nodes $310_1$, $310_2$, $310_3$, and the child node $310_3$ has two direct child nodes $310_4$ and $310_5$, then hash tree 210 has the same schema: root node 304, three direct child nodes $306_1$, $306_2$, $306_3$, and the child node $306_3$ has two direct child nodes $306_4$ and $306_5$.

As used herein, a "direct" child or a node located "directly" underneath another node is a node that is connected to its parent node without an intermediate node between the parent node and child node. For example, node $306_1$ is a direct child of root node 304, and root node 304 is a direct parent of node $306_2$. An "indirect child" or node located "indirectly" underneath another node is a node that is connected to its parent through at least one intermediate node. For example, node $306_6$ is an indirect child of node $306_3$ and of root node 304, and root node 304 is an indirect parent of nodes $306_4$ and $306_6$.

As used herein, a "mirror node" is a node within the hash tree 210 or the data object 204 that is within the same position, as indicated by the schema 404. For example, node $306_3$ is the mirror node of node $310_3$ and vice versa. Node $310_6$ is the mirror node of node $306_6$ and vice versa.

Figure 4B:
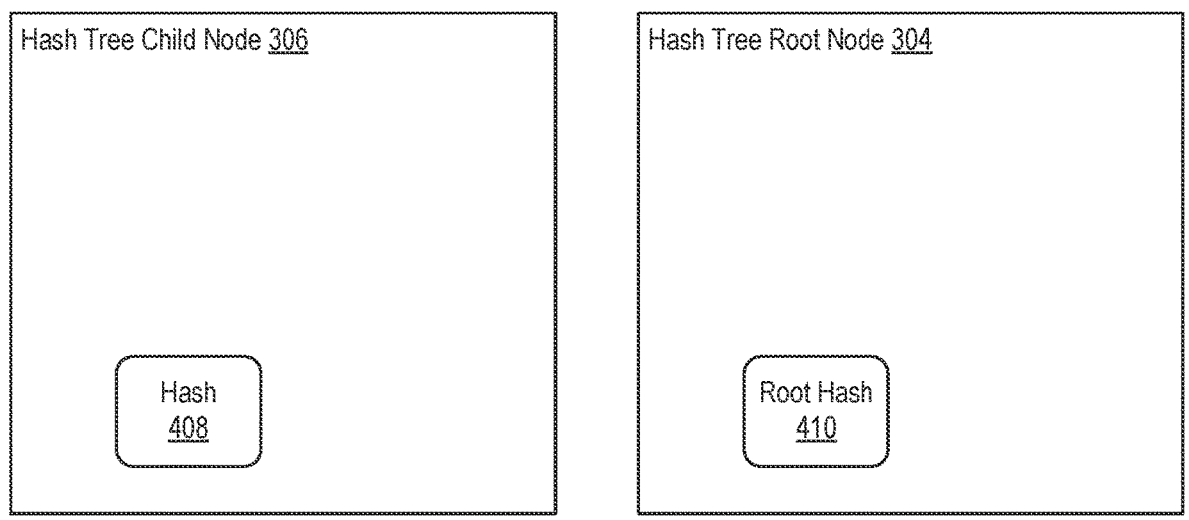
FIG. 4B depicts a block diagram of exemplary hash tree nodes, according to an embodiment.

Each child node 306 comprises a hash 408, as shown in FIG. 4B, and each root node 304 comprises a root hash 410, as shown in FIG. 4B. The hash 408 is an output of a hash function, such as SHA-3 or Keccak256. The root hash 410 is also an output of a hash function, such as SHA-3 or Keccak256. What is hashed to obtain hash 408/410 depends on whether the hash is contained within a node 306 that is a leaf node of hash tree 210, within a node 306 that is a non-leaf node, or within the root node 304.

If the hash 408 is contained within a node 306 that is a leaf node of hash tree 210, then the input to the hash function used to obtain the hash 408 comprises all data within the mirror node of the node 306, and optionally, a salt value. A salt value is a value that is difficult to generate, access, or guess by a malicious actor that might be trying to infer value of data in leaf node 310 through the hash 408 in leaf node 306. In an embodiment, a salt value is a randomly generated value. For example, leaf node $310_6$ may contain a social security number (SSN) and leaf node $306_6$ may contain the hash of that SSN. A malicious actor may guess the SSN within node $310_6$ by hashing all SSN in existence until one resulting hash matches the hash 408 within the mirror node $306_6$. However, if the input to obtain the hash 408 includes a salt value unknown to the malicious actor, then no hashes of each SSN in existence will match the hash 408. The salt value may be stored off of hybrid blockchain 114, or the salt value may be stored as a data object 204 within the hybrid blockchain 114, with access to that data object 204 being controlled through permissions enforced a node controller 502, further discussed below with reference to FIG. 5.

If the hash 408 is contained within a node 306 that is a non-leaf node, then the input to the hash function used to obtain the hash 408 comprises hashes 408 of all direct child nodes 306, and optionally, all data within the mirror node 310. For example, the input to the hash function used to obtain hash 408 of node $306_3$ may be (a) only hashes 408 of nodes $306_5$ and $306_4$, or (b) hashes 408 of nodes $306_5$ and $306_4$, as well as all data within mirror node $310_3$.

If the hash is a root hash 410 contained within the root node 304, then the input to the hash function used to obtain the root hash 410 comprises hashes 408 of all direct child nodes 306, optionally, all data within the mirror root node 310, further optionally, all root hashes 410 of the previous block 202, and further optionally a signature of one or more nodes 104. For example, the input to the hash function used to obtain root hash 410 of node 304 of hash tree $210_2$ may be (a) only hashes 408 of nodes $306_1$, $306_2$, and $306_3$, (b) hashes 408 of nodes $306_1$, $306_2$, and $306_3$, as well as all data within mirror root node 308, or (c) hashes 408 of nodes $306_1$, $306_2$, and $306_3$, all data within mirror root node 308, as well as all root hashes 410 of the previous block $202_1$.

As shown in FIG. 3, the "T" in nodes $306_3$ and $310_3$ indicates that some or all data of data object 204 may be tagged with labels or tags indicating permissions that apply to that data. As described above, permissions are associated entities that are using the blockchain system 102, and the associations may be stored within key store 506 of each node 104. For example, one of node 308/310 of a data object 204 may be tagged as personally identifiable information (PII), which under certain laws, may not be allowed to leave the borders of certain countries. This means that if a node 104 is located outside of those borders, and that node 104 requests from another node 104 data object 204 that contains PII, the PII may be redacted before the data object is provided to the requesting node 104, or the data request may be denied by the other node 104.

A redaction may be performed by deleting (or "pruning") one or more of nodes 310, by setting the pointer from the parent node 310/308 to the node 310 to be redacted to NULL, or by writing zeroes over the data in the node 310 to be redacted. In an embodiment, when a node 308/310 is redacted, all of its direct and indirect child nodes 310 are also redacted. In another embodiment, when a node 308/310 is redacted, only that node is redacted and not any of its child nodes 310.

Although FIG. 3 shows only one type of tag, "T", data within a transaction 210 may contain many types and categories of tags indicating a variety of permission types and levels that pertain to access privileges of data within the data set 108. Although the tag "T" is shown in FIG. 3 as present in both mirror nodes within the hash tree 210 and the data object 204, in an embodiment, a tag indicating permissions may be present within only a single mirror node, such as only within the data object 204 or within the hash tree 210.

In an embodiment, the hash tree 210 has a slightly modified or optimized object form or schema 404 as compared to its mirror data object 204. The blockchain 106 is immutable, so it is useful to minimize the amount of data stored on the blockchain 106. Once data on the blockchain 106 grows to a large amount, it cannot be reduced. It is therefore useful to take preemptive measures to reduce the amount of data that is stored on the blockchain 106. One way to do so is to reduce the number of hashes 408 on hash tree 210, which can be done along with removing certain nodes 306 containing the removed hashes 408.

Nodes from a hash tree 210 can be removed by shortening the height or by shortening the width of the hash tree 210. The shortening can be regarded as optimizing the size of the hash tree 210 around tagged nodes 306. Mirror nodes 310 of tagged nodes 306 may be redacted when providing data object 204 to another entity if the permission of that entity does not allow the entity to access the tagged node(s) 310. If data of tagged node 310 is missing/redacted, then tagged node 310 cannot be validated by recalculating hash 408/410. However, remaining data can still be validated if the hash 408/410 of the redacted node 310 is still available. This means that for the remaining data to be validated, mirror node 306 of a tagged node 310 cannot be removed from its hash tree 210 even if its mirror node 310 is redacted from a data object 204.

An example of optimizing the size of a hash tree 210 by shortening the width of the hash tree 210 may be illustrated with reference to exemplary hash tree $210_2$ of FIG. 3. Nodes $306_1$ and $306_2$ can be merged into a single node, such as node $306_2$. If nodes $306_1$ and $306_2$ are merged into a single node $306_2$, the hash 408 within the node $306_2$ may be obtained from input that includes data of nodes $310_1$ and $310_2$. The data of nodes $310_1$ and $310_2$ may then be validated together by hashing input that includes data from both nodes, and comparing the result to hash 408 of $306_2$. Not having the node $306_1$ or the hash 408 within the node $306_1$ reduces the amount of data that is stored within the hash tree 210 and within the blockchain 106.

An example of optimizing the size of a hash tree 210 by shortening the height of the hash tree 210 also may be illustrated with reference to exemplary hash tree $210_2$ of FIG. 3. Node $306_3$ is a tagged node and therefore, node $306_3$ cannot be removed. However, none of the child nodes 306 of node $306_3$ are tagged, and so, all but one of the child nodes 306 may be removed or merged into a single remaining node 306. The calculation of hashes 408 within node $306_5$ may be modified such that hash 408 within node $306_5$ comprises data of both nodes $310_5$ and $310_6$, and a single hash is created out of the data of these two nodes and then placed within $306_5$. The data within nodes $310_6$ and $310_5$ may then be validated by hashing both and comparing the resulting hash to hash 408 of node $306_5$. Node $306_4$ may further be merged into $306_5$ as another example of shortening width. The calculation of hashes 408 within node $306_5$ may be modified such that hash 408 within node $306_5$ comprises data of nodes $306_4$, $310_5$, and $310_6$, and a single hash is created out of the data of these three nodes and then placed within $306_5$. The data within data object 204 nodes $310_4$, $310_6$ and $310_5$ may then be validated by hashing input that includes data of all three of these nodes and comparing the resulting hash to hash 408 of node $306_5$.

It should be noted that if hash trees 210 are to be optimized within the blockchain system 102, then the validation algorithm of the blockchain system 102 may need to be modified to predict from the data object $204_2$ how the mirror hash tree $210_2$ is optimized in size, so as to properly match which nodes 310 are to be used as input for recalculation of a given hash 408.

Figure 5:
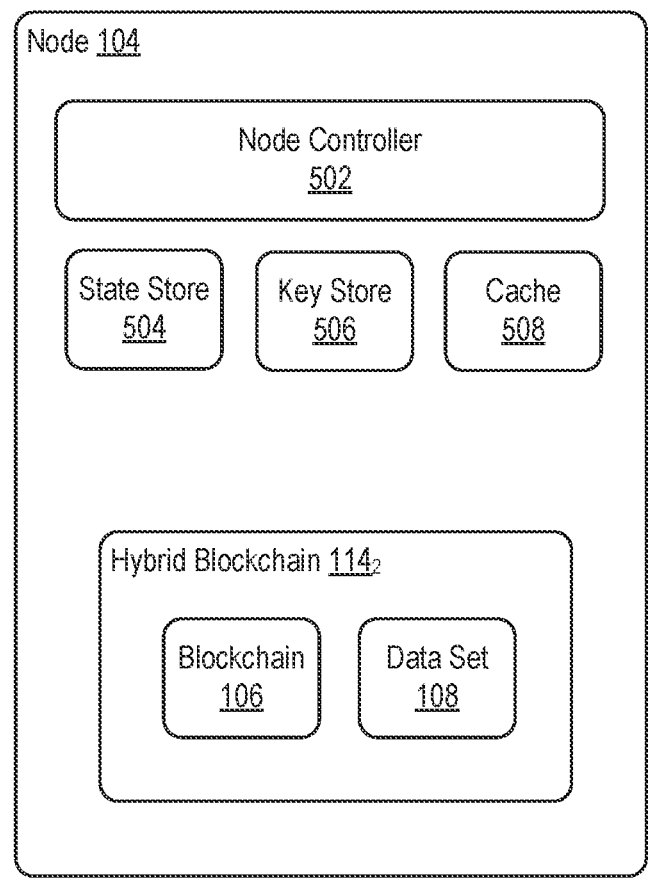
FIG. 5 depicts a block diagram of an expanded view of a blockchain system node, according to an embodiment.

FIG. 5 depicts a block diagram of an expanded view of a node 104, according to an embodiment. FIG. 5 shows additional components, as compared to components shown in FIG. 1, of one of nodes 104. The additional components include a node controller 502, a state store 504, a key store 506, and a cache 508.

The node controller 502 is a logic control unit of each node 104. Although the node controller 502 is shown as a single module, node controller 502 may be implemented as a plurality of modules working together to perform the functions of the node controller 502. The node controller 502 performs a variety of functions. The node controller 502 redacts data from data set 108 or from a copy of a data object 204, the copying having been made so as to fulfill a read request. The redaction is performed as per permissions of requesting entity, before providing data to the requesting entity. If the node 104 containing node controller 502 does not have requested data, the node controller 502 may request the data from another node 104 or may transfer the request to another node 104. The node controller 502 sends notifications to appropriate entities when certain data is added to the hybrid blockchain 114. For example, when data pertinent to a smart contract is added to the hybrid blockchain 114, the node controller may notify that smart contract of the data.

State store 504 stores pointers to blocks 203 and/or blocks 202. Each pointer represents a version of object 204. Each pointer may be a pointer only to the latest versions of different objects 204, or each pointer may be either a pointer to the latest version of an object 204 or to previous versions of an object 204. For example, assume object 204 is a catalog of books carried by a bookstore. If the catalog is updated, then a new transaction 216 is added to the hybrid blockchain 114. A pointer within the state store 504 may be updated to point to the newly added transaction 216. The previous pointer to the previous version of the catalog may remain, and may allow retrieval of past versions of the bookstore's catalog, for historical or auditing purposes.

Key store 506 stores associations between entities and permissions of those entities with regard to data on the hybrid blockchain 114, as described above.

Cache 508 stores data has been recently transmitted from the node 104 to another entity of the blockchain system 102. For example, if an entity requested to view a book, but had permission to only see title, author, and cover page of the book, and not the contents, then cache 508 stores the title, author, and cover page that were transmitted to the requesting entity, but cache 508 does not store the contents of the book. In this example, a book may be regarded as one of objects 204 or as one of nodes 310, depending on the schema 404. Components 502 through 508 are further described with reference to FIGS. 6 through 9, below.

Figure 6:
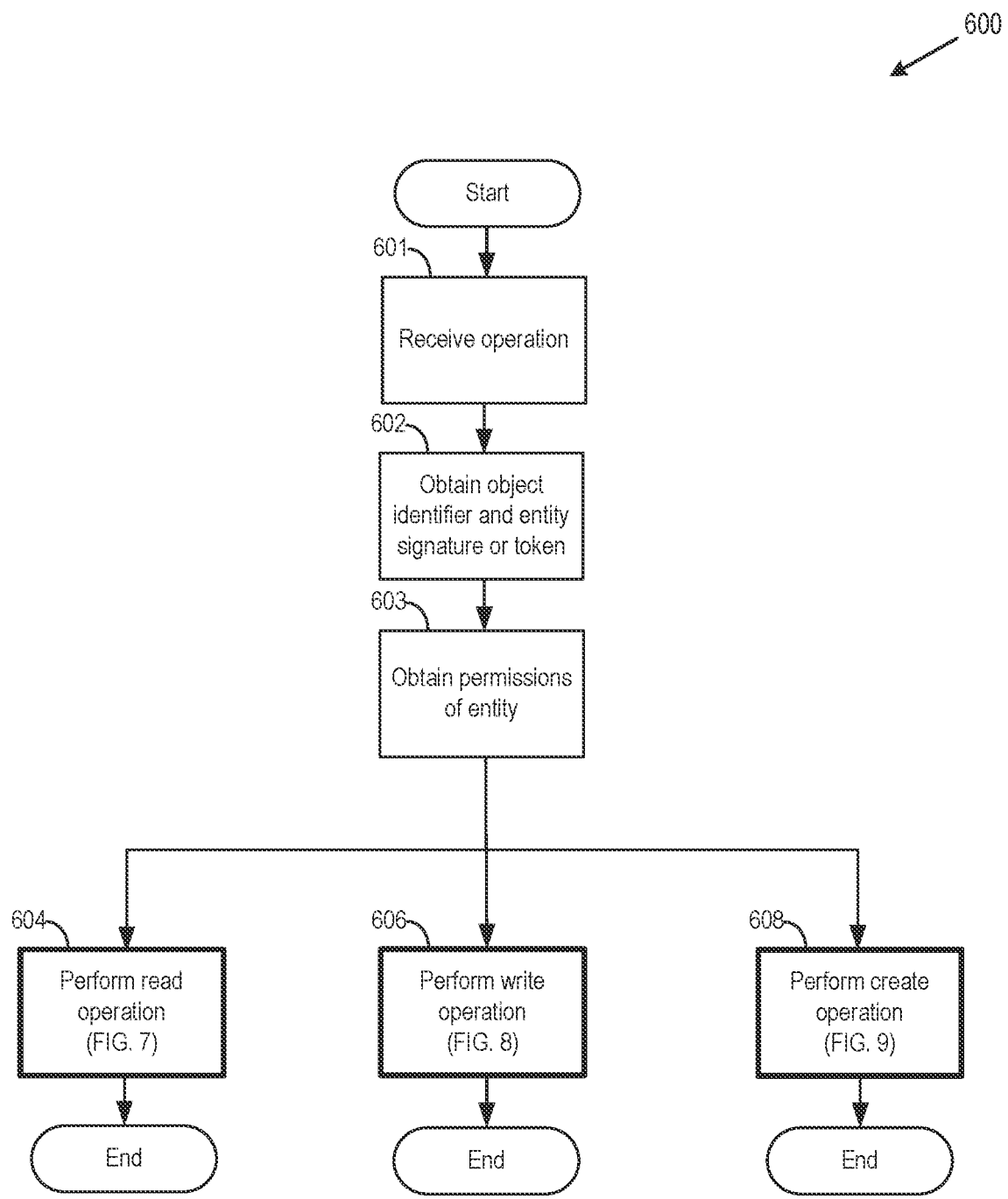
FIG. 6 depicts a flow diagram of a method of handling a data operation from an entity to a blockchain system node, according to an embodiment.

FIG. 6 depicts a flow diagram of a method 600 of handling a data operation from an entity to a node 104, according to an embodiment. Method 600 may be performed by the node controller 502 of the 104 that received the operation.

At step 601, one of nodes 104 receives a data operation from an entity. The received data operation may comprise an identifier of object 204 to which the operation applies, as well as a signature 406 or a token of the entity that sent the data operation. Optionally, the operation may also comprise the version number of the object 204 to which the operation applies.

At step 602, the node controller 502 obtains the object identifier and the signature 406 or token received with the data read operation at step 601.

At step 603, the node controller 502 obtains a set of permissions associated with the entity that sent the data operation at step 601. The obtaining the permissions associated with the entity may be based on at least one of: (a) authentication of a signature of the entity, (b) authentication of a token associated with the entity, wherein the token anonymizes the identity of the entity, or (c) a zero-knowledge-proof.

The operation may be a data read operation, a data write operation, or a data create operation. As used herein, a data read operation is an operation that requests transmission of data from the hybrid blockchain to the requesting entity. As used herein, a data write operation is an operation that edits existing data the data set 102 by replacing the existing data with new data or by deleting the existing data. As used herein, a data create operation is an operation that adds new data to the data set 102 without replacing or deleting existing data on the data set 102.

If the operation is a data read operation, the method 600 continues to step 604, which is further described with reference to FIG. 7. If the operation is a data write operation, the method 600 continues to step 606, which is further described with reference to FIG. 8. If the operation is a data create operation, the method 600 continues to step 608, which is further described with reference to FIG. 9. Each step of methods 700, 800, and 900 may be performed by a node controller 502, unless otherwise specified.

Figure 7:
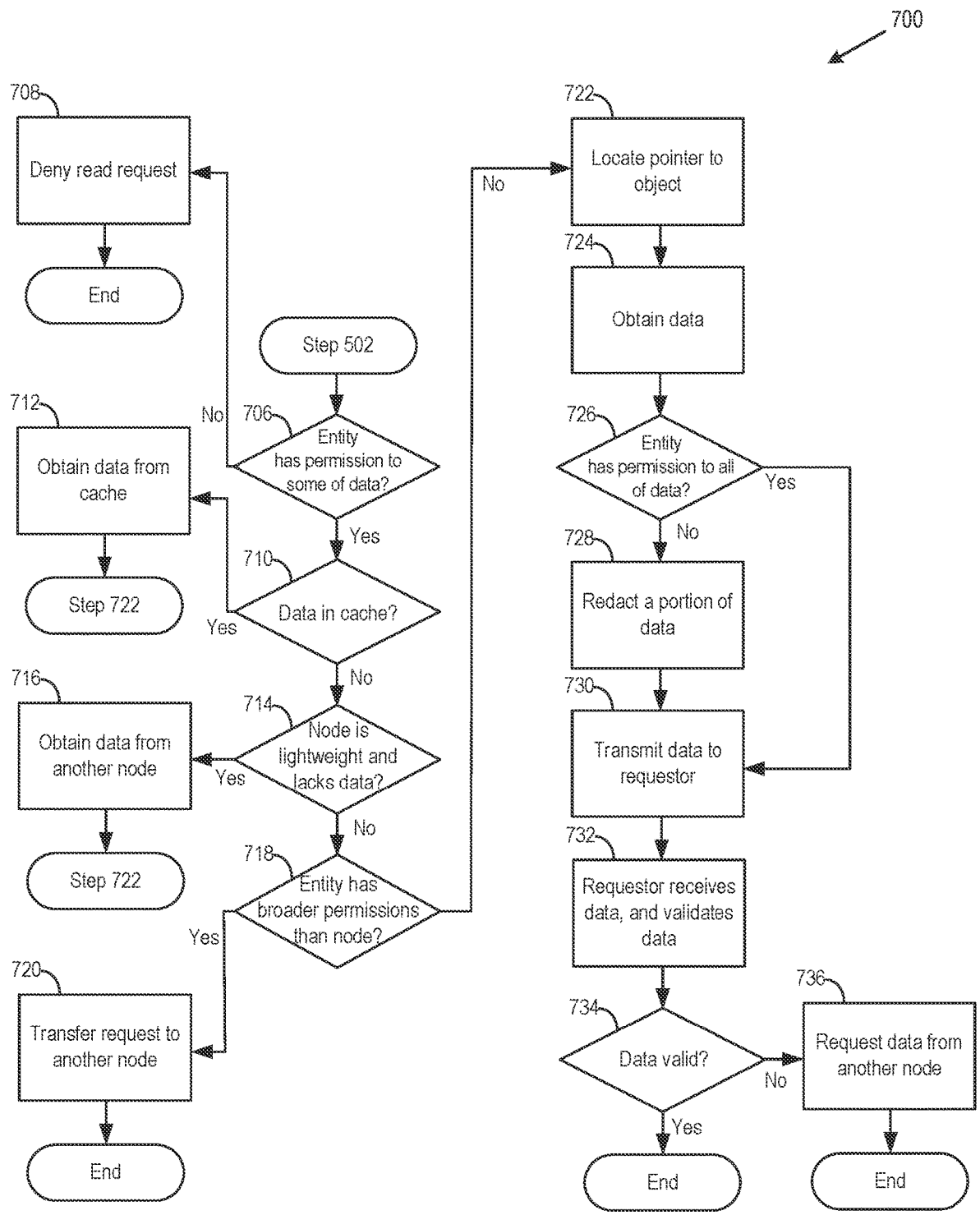
FIG. 7 depicts a flow diagram of a method of handling a data read operation by a node controller of the blockchain system, according to an embodiment.

FIG. 7 depicts a flow diagram of a method 700 of handling a data read operation by a node controller 502 of the blockchain system 102, according to an embodiment.

At step 706, the node controller 502 determines whether the requesting entity has permission to access at least some of the data requested. If no, then the method 700 continues to step 708 at which the data read operation is denied, and the method 700 as well as 600 ends. If the requesting entity has permission to access at least some of the data requested, then the method 700 continues to step 710.

At step 710, the node controller 502 determines whether the data requested by the operation, modified if necessary by redacting data as per entity permissions, is present within the cache 508. If the requested data, as modified per permissions, is within the cache 508, then the method 700 continues step 712. If not, then the method 700 continues to step 714. For example, if the entity requested to view a book, but had permission to only see title, author, and cover page of the book, and not the contents, but the cache 508 only has an entry for a copy of the entire book, then the method 700 continues to step 712. If the cache 508 contains an entry for exactly title, author, and cover page of the book, then the method 700 continues to step 714.

At step 712, the node controller 502 obtains requested data from the cache 508 and transmits the data to the requesting entity. After step 712, the method 700 ends, also ending the method 600.

At step 714, the node controller 502 determines whether the node 104 containing the node controller 502 has all requested data to which the requesting entity has permission. As described above, a node 104 may not have all of the data set 108, and may instead be a lightweight node 104 that contains only a portion of the data set 108. If the node 104 that received the operation of step 601 has all requested data to which the requesting entity has permission, then the method 700 continues to step 718. Otherwise, the method 700 continues to step 716, where the node controller 502 requests the required data from a second node 104. The second node 104 may handle the request by performing the steps of FIG. 7.

At step 718, the node controller 502 determines whether the requesting entity is requesting data that the receiving node 104 is not allowed to have, as per permissions of receiving node 104. For example, the requesting entity may be a person in a country requesting data that can only be located in that country, but that person is travelling and that person's request might have been sent to the nearest node 104 that is located outside of that country. If the requesting entity is requesting data that the receiving node 104 is not allowed to have, then the method 700 continues to step 720. Otherwise, the method 700 continues to step 722.

At step 720, the receiving node 104 transfers the operation received at step 601 to a second node 104 to handle the operation. The second node may handle the operation by performing the steps of FIG. 7.

At step 722, the node controller 502 accesses the state store 504 to retrieve a pointer to the data object 204 or to the transaction 216 matching or containing the object identifier obtained at step 602. The pointer may be to a region of storage or memory comprising the data object 204, the region being located within the node 104 or outside of the node 104 but accessible to the node 104. If the received operation also contained a version identifier of the object 204 that the requesting entity would like to read, then the pointer to the indicated version of the object 204 is located by node controller 502.

At step 724, the node controller 502 obtains the data requested by the read operation, such as by obtaining the data object 204 indicated by an object identifier and optionally by a version identifier, through the pointer located at step 722. As part of step 724, the node controller 502 also obtains the mirror hash tree 210 of the obtained data object 204.

At step 726, the node controller 502 determines whether the requesting entity has permission to all data obtained at step 724. If so, then the method 700 continues to step 730. If not, then the method 700 continues to step 728.

At step 728, the node controller 502 makes a copy of the requested data and redacts from the copy some of the data object 204 that was obtained at step 724. The redaction may be performed by comparing permissions of the requesting entity obtained at step 603 to tags of data object nodes 308/310, as described above.

At step 730, the node controller 502 transmits requested data, if necessary redacted data as per step 728, to the requesting entity. The transmitted data includes the possibly redacted data object, as well as the unredacted mirror hash tree 210.

At step 732, the requesting entity receives the requested data object 204 and the mirror hash tree 210. The requesting entity or the device of the requesting entity (such as the user device 112) validates the received data object 204. As part of the validation, the requesting entity may retrieve the salt value used to calculate the hash value of leaf nodes of the received hash tree 210. Although validation is performed by the requesting entity, optionally, validation may be performed by the node controller 502 of the receiving node 104 before transmitting data in step 730.

Validation of data object 204 may be performed by recalculating hashes 408 and root hash 410 using the same hash function, inputs, and process as for the calculation of hashes 408 and root hash 410 within the mirror hash tree 210. After recalculation, the recalculated hashes are compared to the hashes within the mirror hash tree 210, and if all compared hashes match, then the data object 204 is validated. Otherwise, the data object 204 is not validated.

At step 734, the requesting entity determines whether the received data is valid. If so, the method 700 ends. If not, the method 700 may optionally continue to step 736 where the request is sent to another node 104 whose data may not have been corrupted. Step 736 may be performed by performing the steps of FIG. 7. After step 736, the method 700 ends.

Figure 8:
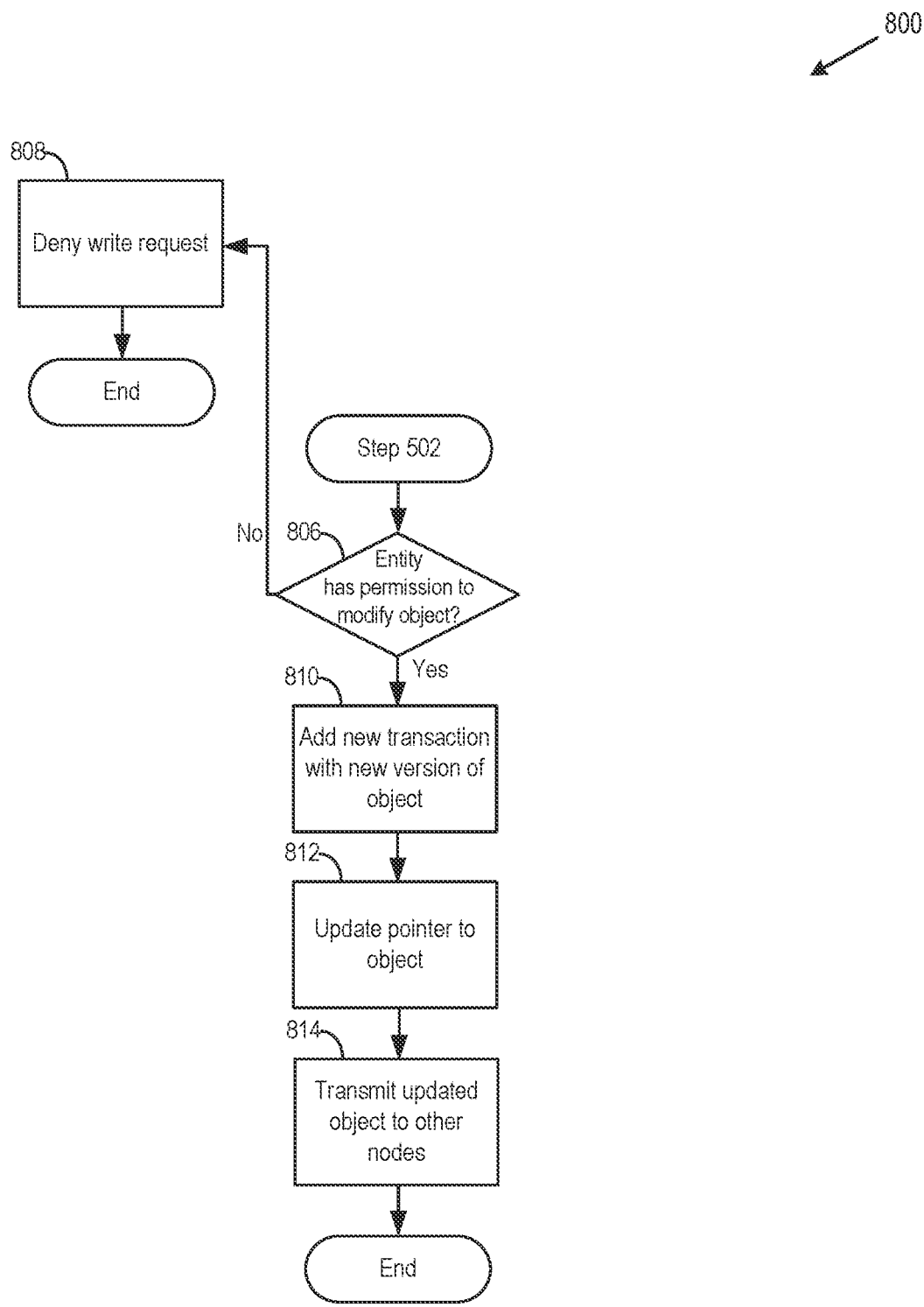
FIG. 8 depicts a flow diagram of a method of handling a data write operation by a node controller of the blockchain system, according to an embodiment.

FIG. 8 depicts a flow diagram of a method 800 of handling a data write operation by a node controller 502 of the blockchain system 102, according to an embodiment.

At step 806, the node controller 502 determines whether the entity requesting to make a write operation has permission to modify the object 204 identified by the received object identifier. If no, then the method 800 continues to step 808 at which the data write operation is denied, and the method 800 as well as 600 ends. Otherwise, the method 800 continues to step 810.

At step 810, the node controller 502 adds a new transaction 216 to the copy of the hybrid blockchain 114 located on the node 104 of the node controller 502. The transaction 216 includes a new version of object 204 that is being modified through the received write operation. It should be noted that although object 204 is being "modified," no data is deleted from the hybrid blockchain 114. Rather, a new version of the data object 204 is added to the hybrid blockchain 114 by adding a new block 203 containing the new version of object 204 to the data set 108, along with adding a new block 202 to the blockchain 106 containing a hash tree 210 of cryptographic proofs of the newly added version of the object 204. The hash tree 210 may be constructed in an optimized manner, as described above, so that the object form, structure, or schema of the hash tree 210 does not exactly match the schema 404, but a validation algorithm used to later validate data is configured to validate the data object 204 despite object forms not matching.

At step 812, the node controller 502 updates, within the state store 504, a pointer or adds a new pointer to point to the new version of the data object 204 that was added to the hybrid blockchain 114 at step 810. The pointer may be to a region of storage or memory comprising the data object 204, the region being located within the node 104 or outside of the node 104 but accessible to the node 104. The new or updated pointer may point generally to the newly added transaction 216, to block 203 of the transaction 216, to block 202 of the transaction 216, or to the object 204.

At step 814, the newly added transaction 216 is added to other copies of the hybrid blockchain 114, on other nodes 104, through the modified consensus mechanism. Optionally, as part of step 814, the node controller 502 sends a notification to "need-to-know" entities of the blockchain system 102. For example, if certain smart contracts use the object 204 that has been modified, then those smart contract may be notified of the modification of object 204. For another example, all entities that have permission to read or write to the data object 204 that was modified may receive a notification of the write operation from the node controller 502 that executed the initial write operation to modify that object 204. After step 814, the method 800 ends, also ending the method 600.

Figure 9:
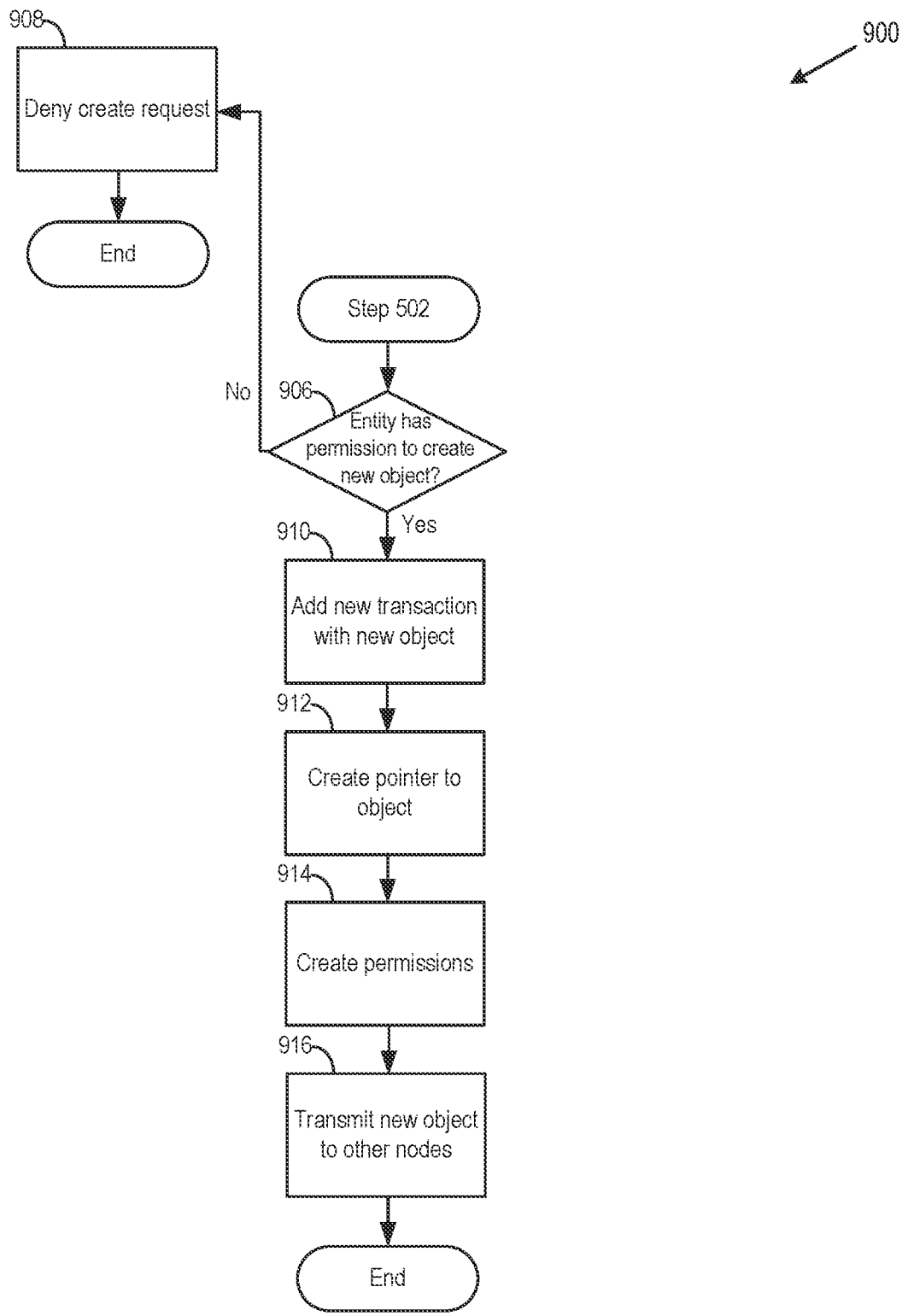
FIG. 9 depicts a flow diagram of a method of handling a data create operation by a node controller of the blockchain system, according to an embodiment.

FIG. 9 depicts a flow diagram of a method 900 of handling a data create operation by a node controller 502 of the blockchain system 102, according to an embodiment.

At step 906, the node controller 502 determines whether the entity requesting to make a create operation has permission to create new objects 204. If no, then the method 900 continues to step 908 at which the data create operation is denied, and the method 900 as well as 600 ends. Otherwise, the method 900 continues to step 910.

At step 910, the node controller 502 adds a new transaction 216 to the copy of the hybrid blockchain 114 located on the node 104 of the node controller 502. The transaction 216 includes a new and first version of object 204 that is being created through the received create operation.

At step 912, the node controller 502 adds a new pointer to point to the newly created data object 204 that was added to the hybrid blockchain 114 at step 910. The new pointer may point generally to the newly added transaction 216, to block 203 of the transaction 216, to block 202 of the transaction 216, or to the new object 204.

At step 916, the newly added transaction 216 is added to other copies of the hybrid blockchain 114, on other nodes 104, through the modified consensus mechanism. Optionally, as part of step 916, the node controller 502 sends a notification to "need-to-know" entities of the blockchain system 102. For example, all entities that have permission to read or write to the data object 204 that was created may receive a notification of the create operation from the node controller 502. After step 916, the method 900 ends, also ending the method 600.

Figure 10:
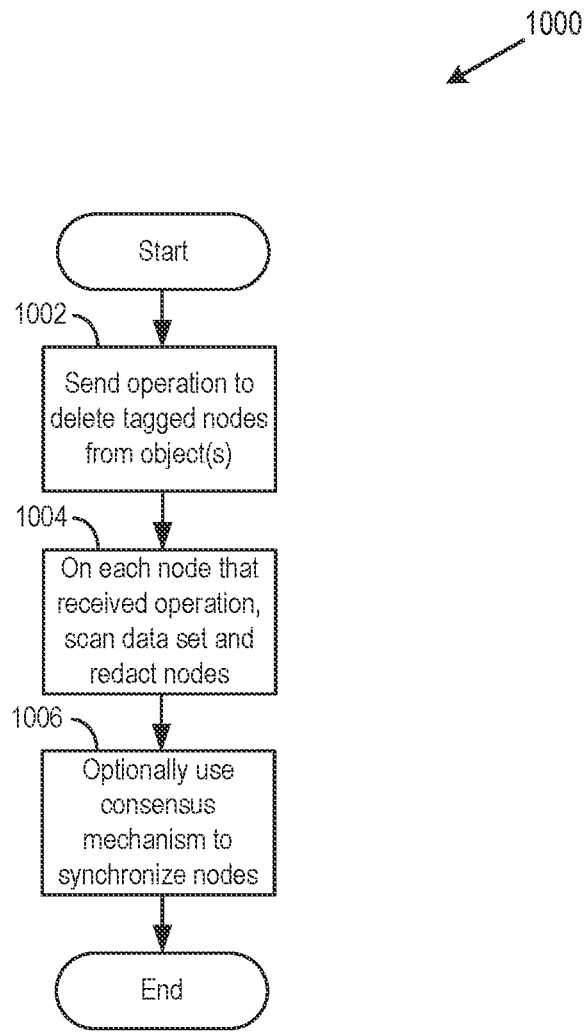
FIG. 10 depicts a flow diagram of a method of deleting information from all versions of a data object of the hybrid blockchain, according to an embodiment.

FIG. 10 depicts a flow diagram of a method 1000 of deleting certain tagged information from all versions of a data object 204 of the hybrid blockchain 114, according to an embodiment. Method 1000 is executed if, for example, an entity decides that the entity does not want certain information, such as personal information, to be on the blockchain system 102 any longer. The information may be present within a certain data object or within several data objects. The information may be redacted from the blockchain system 102 in all versions of data objects 204.

At step 1002, an operation is sent to some or all nodes 104 of the blockchain system 102 to delete certain information from the data set 108. The operation may initially be sent from the entity to a first node 104, and then the first node 104 may send the operation to some or all other nodes 104. Or, the operation may be send from the entity to the some or all nodes 104 directly. If the operation is sent to some but not all nodes 104, then the operation may be sent to a majority of the nodes 104, and the new version of the hybrid blockchain would then be synchronized with the rest of the nodes 104 through the consensus mechanism of the blockchain system 102. Alternatively, the operation may be sent to all nodes 104 or all non-historian nodes 104, and nodes 104 individually redact the applicable information, without synchronization through the consensus mechanism. If a historian node 104 exists and the operation is sent to all nodes, then the historian node may optionally block or deny the delete operation, or alternatively, the operation may be sent to all nodes 104 except the historian node 104.

At step 1004, each node that received the operation of step 1002 scans its copy of the data set 108 for the applicable information. The information may be identified by, for example one or more object identifiers together with one or more tags identifying nodes 308/310 to be redacted. For example, the operation may specify that all nodes 310 tagged with a "T" tag within a certain type of data object 204 are to be redacted. Optionally, step 1004 is not performed on a historian node of the blockchain system 102.

At step 1006, optionally, the consensus mechanism synchronizes copies of data sets 108 throughout the blockchain system 102. As described above, step 1006 may be performed if the operation is sent to a majority of nodes 104 and not to all non-historian nodes 104. After step 1006, the method 1000 ends.

Similarly to the method 1000, if permissions of a node 104 change, that node 104 may scan through the copy of its data set 108 and remove any objects 204 or nodes 308/310 that do not comply with the new permissions. Also, if status of certain information changes, then node 104 may scan through the copy of its data set 108 and apply tags to the information, as per the new status of that information.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of performing data operations on a first blockchain node of a plurality of blockchain nodes of a blockchain system, the blockchain system comprising an immutable blockchain and a mutable data set that are distributed among the plurality of blockchain nodes, wherein the immutable blockchain comprises cryptographic proofs of data of the mutable data set, the method comprising:
   receiving a read operation from an entity;
   executing, based on permissions associated with the entity, the read operation by accessing the mutable data set, wherein executing the read operation comprises:
      obtaining, using an identifier of a data object included in the read operation, a copy of the data object from the first blockchain node;
      redacting, based on the permissions of the entity, a portion of the copy of the data object by removing the portion from the copy of the data object to produce a redacted copy of the data object; and
      transmitting, to the entity, the redacted copy of the data object and a hash tree comprising one or more cryptographic proofs of the data object, wherein the one or more cryptographic proofs comprises a signature of one or more nodes of the blockchain system; and
   executing a write operation or a create operation, wherein executing the write operation or the create operation comprises:
      adding a new object to the mutable data set of the first blockchain node;
      creating a hash tree comprising one or more cryptographic proofs of the new object;
      adding, after reaching a consensus by the plurality of blockchain nodes, the hash tree to a new block of the immutable blockchain;
      creating a pointer to the new object; and
      transmitting the hash tree and the new object to some or all nodes of the plurality of blockchain nodes.

2. The method of claim 1, wherein the entity is not a node of the blockchain system.

3. The method of claim 1, further comprising:
   checking a cache for presence of the redacted data object.

4. The method of claim 1, further comprising:
   determining that the data object is not located within the first blockchain node; and
   requesting the data object from a second blockchain node.

5. The method of claim 1, further comprising:
   determining that the first blockchain node does not have permission to contain the data object;
   transferring the data operation to a second blockchain node; and
   performing the obtaining a copy of the data object.

6. The method of claim 1, further comprising:
   validating the data object by recalculating the cryptographic proofs located within the hash tree.

7. The method of claim 1, wherein performing the write operation or the create operation further comprises:
   calculating the one or more cryptographic proofs of the new object; and
   reaching the consensus by the plurality of blockchain nodes using a consensus mechanism.

8. The method of claim 7, wherein the transmitting of both the hash tree and the new object is performed by the consensus mechanism.

9. The method of claim 7, further comprising transmitting a notification to some of the plurality of blockchain nodes that the new object has been modified.

10. The method of claim 7, wherein the hash tree has the same object form as the new object.

11. The method of claim 7, wherein the hash tree and the data object are both of a tree object form, each tree having a plurality of tree nodes, each tree node having a mirror node on the other tree, further comprising, prior to the adding the hash tree to the new block:
calculating a new cryptographic proof and storing the new cryptographic proof within a first node of the hash tree, wherein the new cryptographic proof is calculated with data from the mirror node of the first node of the hash tree and from data from a first node of a data object tree, wherein the first node of the data object tree is not the mirror node of the first node of the hash tree; and
removing the mirror node of the first node of the data object tree from the hash tree.

12. The method of claim 1, further comprising performing a delete operation, wherein performing the delete operation comprises:
scanning the mutable data set of the first blockchain node for a data object identified by the identifier of the data object included in the delete operation; and
deleting some or all of the data object without modifying the immutable blockchain.

13. The method of claim 1, wherein the plurality of blockchain nodes comprises a historian node, and wherein a delete data operation cannot be executed on the mutable data set contained within the historian node.

14. The method of claim 1, wherein the entity is a smart contract.

15. The method of claim 1, wherein the permissions associated with the entity are based on at least one of: (a) authentication of a signature of the entity, (b) authentication of a token associated with the entity, wherein the token anonymizes the identity of the entity, or (c) a zero-knowledge-proof.

16. The method of claim 1, wherein at least some of the cryptographic proofs are obtained by hashing data that includes a salt value.

17. A non-transitory computer readable medium comprising instructions to be executed in a processor of a computer system, the instructions when executed in the processor cause the computer system to carry out a method of performing data operations on a first blockchain node of a plurality of blockchain nodes of a blockchain system, the blockchain system comprising an immutable blockchain and a mutable data set that are distributed among the plurality of blockchain nodes, wherein the immutable blockchain comprises cryptographic proofs of data of the mutable data set, the method comprising:
receiving a read operation from an entity;
executing, based on permissions associated with the entity, the read operation by accessing the mutable data set, wherein executing the read operation comprises:
obtaining, using an identifier of a data object included in the read operation, a copy of the data object from the first blockchain node;
redacting, based on the permissions of the entity, a portion of the copy of the data object by removing the portion from the copy of the data object to produce a redacted copy of the data object; and
transmitting, to the entity, the redacted copy of the data object and a hash tree comprising one or more cryptographic proofs of the data object, wherein the one or more cryptographic proofs comprises a signature of one or more nodes of the blockchain system; and
executing a write operation or a create operation, wherein executing the write operation or the create operation comprises:
adding a new object to the mutable data set of the first blockchain node;
creating a hash tree comprising one or more cryptographic proofs of the new object;
adding, after reaching a consensus by the plurality of blockchain nodes, the hash tree to a new block of the immutable blockchain;
creating a pointer to the new object; and
transmitting the hash tree and the new object to some or all nodes of the plurality of blockchain nodes.

18. The non-transitory computer readable medium of claim 17, wherein the entity is not a node of the blockchain system.

19. A blockchain system comprising:
a plurality of blockchain nodes;
an immutable blockchain distributed among the plurality of blockchain nodes;
a mutable data set distributed among the plurality of blockchain nodes, wherein the immutable blockchain comprises cryptographic proofs of data of the mutable data set; and
a hardware-implemented processor programmed to carry out a method of performing data operations on a first blockchain node of the plurality of blockchain nodes, the method comprising:
receiving a read operation from an entity;
executing, based on permissions associated with the entity, the read operation by accessing the mutable data set, wherein executing the read operation comprises:
obtaining, using an identifier of a data object included in the read operation, a copy of the data object from the first blockchain node;
redacting, based on the permissions of the entity, a portion of the copy of the data object by removing the portion from the copy of the data object to produce a redacted copy of the data object; and
transmitting, to the entity, the redacted copy of the data object and a hash tree comprising one or more cryptographic proofs of the data object, wherein the one or more cryptographic proofs comprises a signature of one or more nodes of the blockchain system; and
executing a write operation or a create operation, wherein executing the write operation or the create operation comprises:
adding a new object to the mutable data set of the first blockchain node:
creating a hash tree comprising one or more cryptographic proofs of the new object;
adding, after reaching a consensus by the plurality of blockchain nodes, the hash tree to a new block of the immutable blockchain;
creating a pointer to the new object; and
transmitting the hash tree and the new object to some or all nodes of the plurality of blockchain nodes.

* * * * *

UNITED STATES PATENT AND TRADEMARK OFFICE
CERTIFICATE OF CORRECTION

PATENT NO. : 12,019,762 B2
APPLICATION NO. : 17/450839
DATED : June 25, 2024
INVENTOR(S) : Jeffrey C. Venable, Sr. et al.

It is certified that error appears in the above-identified patent and that said Letters Patent is hereby corrected as shown below:

In the Claims

In Column 20, Line 58, in Claim 19, delete "node:" and insert -- node; --.

Signed and Sealed this
Third Day of September, 2024

Katherine Kelly Vidal
*Director of the United States Patent and Trademark Office*